United States Patent [19]
Krob et al.

[11] Patent Number: 4,734,006
[45] Date of Patent: Mar. 29, 1988

[54] WHEELED BUILDING AND CONSTRUCTION MACHINE OF THE MECHANICAL SHOVEL, BULLDOZER OR THE LIKE TYPE, HAVING ARTICULATED STEERING

[75] Inventors: Adolf Krob; Detlef Seidel; Peter Kohn; Paul Kohn, all of Konz; Wolfgang Serwe, Welschbillig, all of Fed. Rep. of Germany

[73] Assignee: Zettelmeyer-Baumaschinen GmbH, Konz, Fed. Rep. of Germany

[21] Appl. No.: 843,686

[22] Filed: Mar. 25, 1986

[30] Foreign Application Priority Data

Mar. 28, 1985 [DE] Fed. Rep. of Germany ....... 3511336

[51] Int. Cl.⁴ ............................................. B66C 1/10
[52] U.S. Cl. .................................. 414/719; 280/689; 280/DIG. 1; 180/235
[58] Field of Search ............. 414/685, 699, 708, 719; 280/689, 703; 180/235, 139

[56] References Cited

U.S. PATENT DOCUMENTS 4,236,864 12/1980 Couture et al. ...................... 414/699
4,506,751 3/1985 Stephens ......................... 280/689 X
4,552,238 11/1985 Joyce, Jr. ......................... 180/139 X
4,558,759 12/1985 Baatrup .......................... 180/139 X

FOREIGN PATENT DOCUMENTS 608758 5/1978 U.S.S.R. .............................. 414/685
1010226 4/1983 U.S.S.R. .............................. 414/685

Primary Examiner—Robert J. Spar
Assistant Examiner—Donald W. Underwood
Attorney, Agent, or Firm—Watson, Cole, Grindle & Watson

[57] ABSTRACT

A wheeled building and constructional machine of the mechanical shovel, bulldozer or the like type has an articulated steering system and comprises a vehicle chassis, a plurality of wheel axles, a hydraulic suspension system for the wheel axles, and at least one transversely stabilizing valve. The hydraulic suspension system comprises a plurality of fluid cylinders which are disposed between pivoting levers which are rotatably mounted and hold the wheel axles, and the vehicle chassis, and rotatably mounted on these vehicle parts. The fluid cylinders are adapted for action upon both of sides and are connected to the stabilizing valve or valves.

4 Claims, 5 Drawing Figures

WHEELED BUILDING AND CONSTRUCTION MACHINE OF THE MECHANICAL SHOVEL, BULLDOZER OR THE LIKE TYPE, HAVING ARTICULATED STEERING

BACKGROUND OF THE INVENTION

The present invention relates to an articulated steering construction machine travelling on wheels, such as a mechanical shovel (such as a front-end loader), a bulldozer or the like, comprising a hydraulic suspension of the wheel axles which are held by rotatably mounted pivoting levers, between the pivoting levers and the vehicle chassis fluid cylinders being disposed which are articulately mounted on said vehicle parts.

In mechanical shovels or similar travelling construction machines with articulated steering in various operating conditions and under various loads considerable displacements of the vehicle's centre of gravity result, causing indifferent vehicle handling. In a sprung vehicle with corresponding travelling comfort such great deviations of the centre of gravity can moreover lead to rocking movement, making the driver of the machine feel uncertain. The displacement of the centre of gravity on turning in reduces the stability of the vehicle and this condition is further aggravated when the load mechanism is raised with useful load.

OBJECTS AND SUMMARY OF THE INVENTION

The problem underlying the invention is to eliminate or at least substantially reduce these disadvantages which occur in articulated steering mechanical shovels or similar construction machines with articulated steering and which hitherto have been given far too little attention, by an improvement and configuration of the running gear suspension.

This problem is solved according to an essential feature of the invention in that fluid cylinders which can be acted upon on both sides are connected to at least one transverse stabilizing valve. According to the invention, this transverse stabilizing valve can also communicate with an associated constant load damper. The transverse stabilizing valve effects at a predetermined differential pressure an automatic blocking of the valve so that the fluid in the fluid cylinder at this instant is no longer available for the suspension. The stabilizing of the vehicle is thereby increased even in critical areas disturbed by displacements of the centre of gravity.

According to a further feature of the invention, to take account of articulation angles, a limit switch is provided which, via a relay, transfers signals corresponding to the vehicle bending to a pilot valve. This limit switch is preferably constructed as a proximity switch, which initiates the switching operation at a predetermined bend angle.

The aforementioned disadvantages of the displacement of the centre of gravity on bending in can be eliminated or reduced according to a further feature of the invention also in that a limit switch is secured preferably in the vicinity of the lifting arm mounting on the front frame of the apparatus to signal the height of the shovel to a magnetic valve, which, via a pressure control valve, controls fluid to the fluid cylinders of the rear axle. This initiates an additional supporting of the rear axle and thus also increases the vehicle performance.

BRIEF DESCRIPTION OF THE DRAWINGS

Various features of the invention are illustrated and explained by way of example in the drawings, wherein.

DETAILED DESCRIPTION OF THE PREFERRED EMBODIMENT

Figure 1:
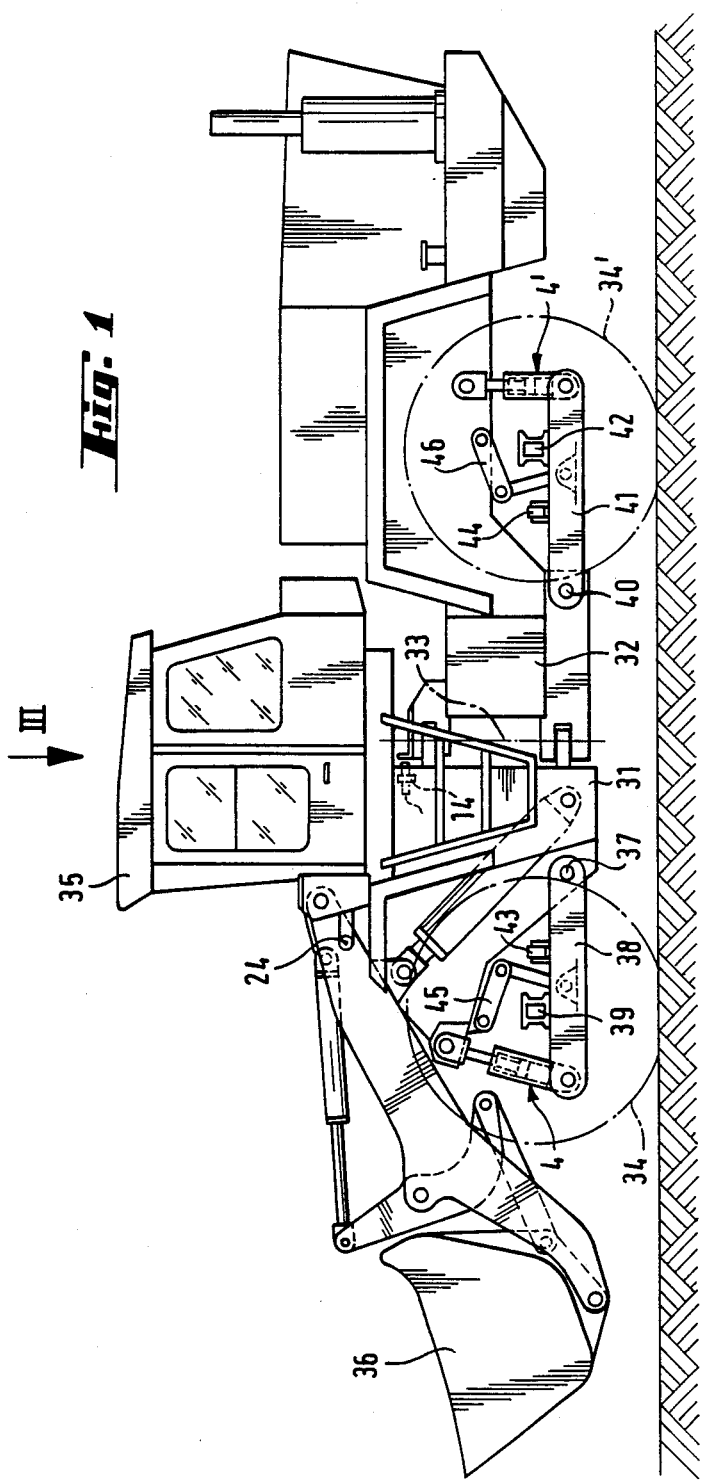
FIG. 1 shows in schematic side view a travelling mechanical shovel with articulated steering.

The wheeled loading shovel shown in FIG. 1 consists of a front carriage with front frame 31 and a rear carriage with rear frame 32, the front frame 31 and the rear frame 32 being connected by the vertical joint pin 33 of an articulation joint. The front carriage, which is provided with two front wheels 34 and on which a driver's cabin 35 is disposed, carries a hydraulically-operable working shovel 36. A scarifier or ripper tool (not illustrated) can for example be provided on the rear carriage, which is provided with two rear wheels 34'. Articulately connected to the front frame 31 is a front pivoting lever 38 which is rotatable about the horizontal axis of a self-aligning bearing 37 and which carries the front axle 39 of the front wheels 34. Correspondingly articulately connected to the rear frame 32 is a rear pivoting lever 41 which is rotatable about the horizontal axis of a self-aligning bearing 40 and which carries the rear axle 42 of the rear wheels 34'. The pivoting levers 38 and 41 hold the front axle 39 and the rear axle 42, respectively, in the longitudinal direction and transmit the braking and advancing forces. When the suspension is effective they serve to receive the oscillating movements of the axles 39 and 42. The pivoting levers 38 and 41 are connected to respective front and rear transverse links 43 and 44, which serve for correct axle guiding and take up lateral thrusts. To limit the transverse inclinations of the vehicle to a permissible extent, tranverse stabilizers 45 and 46 are respectively arranged at the front and rear pivoting levers 38 and 41. The front pivoting lever 38 and the front axle 39 are supported according to the invention by two front fluid cylinders 4 acted on on both sides whilst the rear pivoting lever 41 is adapted to be supported according to the invention correspondingly by two rear fluid cylinders 4', also acted upon on both sides. These fluid cylinders 4 and 4' can be respectivley arranged or articulately connected according to the invention on the one hand to the free ends of the pivoting levers 38 and 41, respectively, and on the other hand to the vehicle bodywork or the front or rear frame 31 and 32, respectively.

Figure 2:
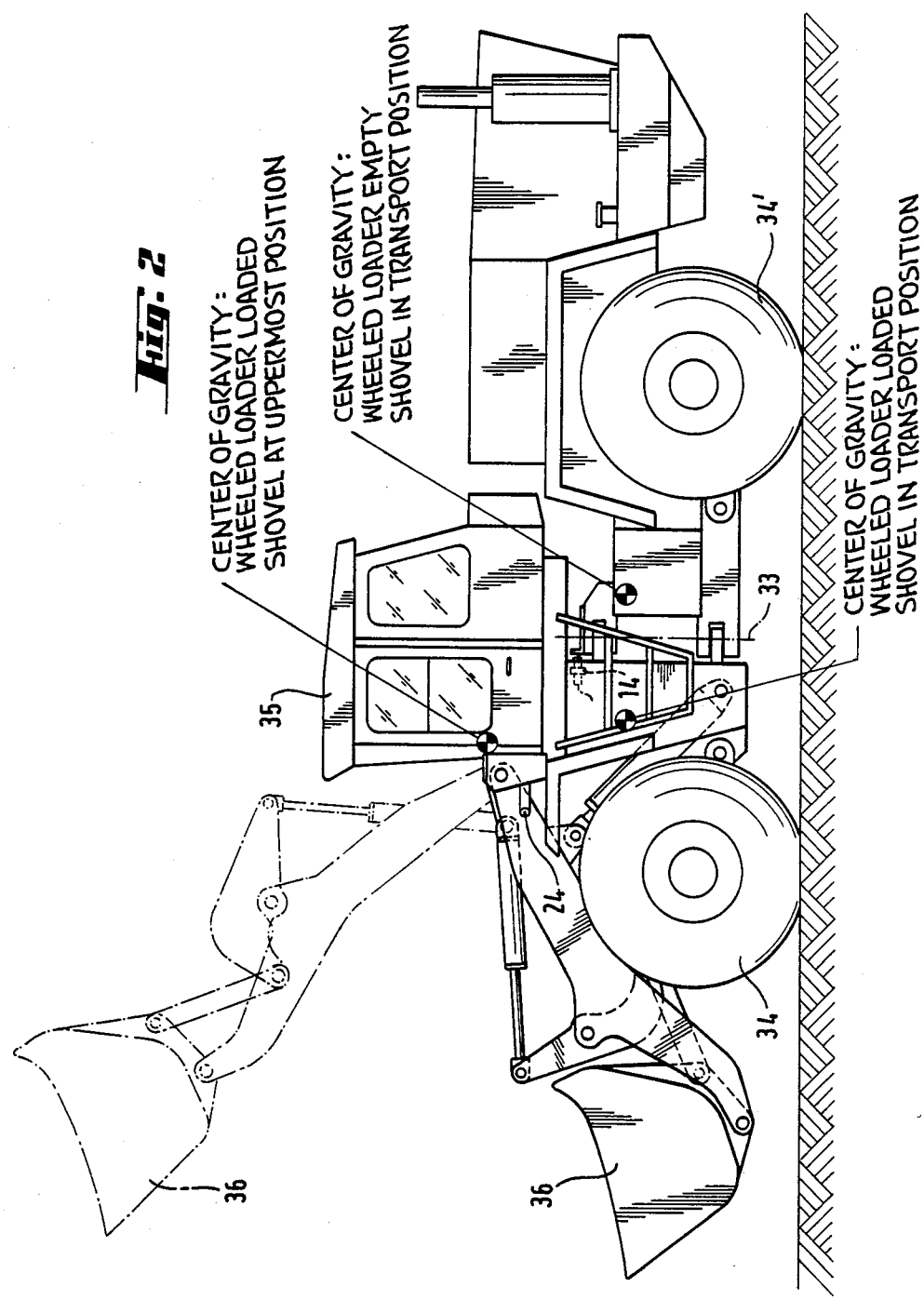
FIGS. 2 and 3 show in side view and in plan view a mechanical shovel with indication of the various centres of gravity.
Figure 3:
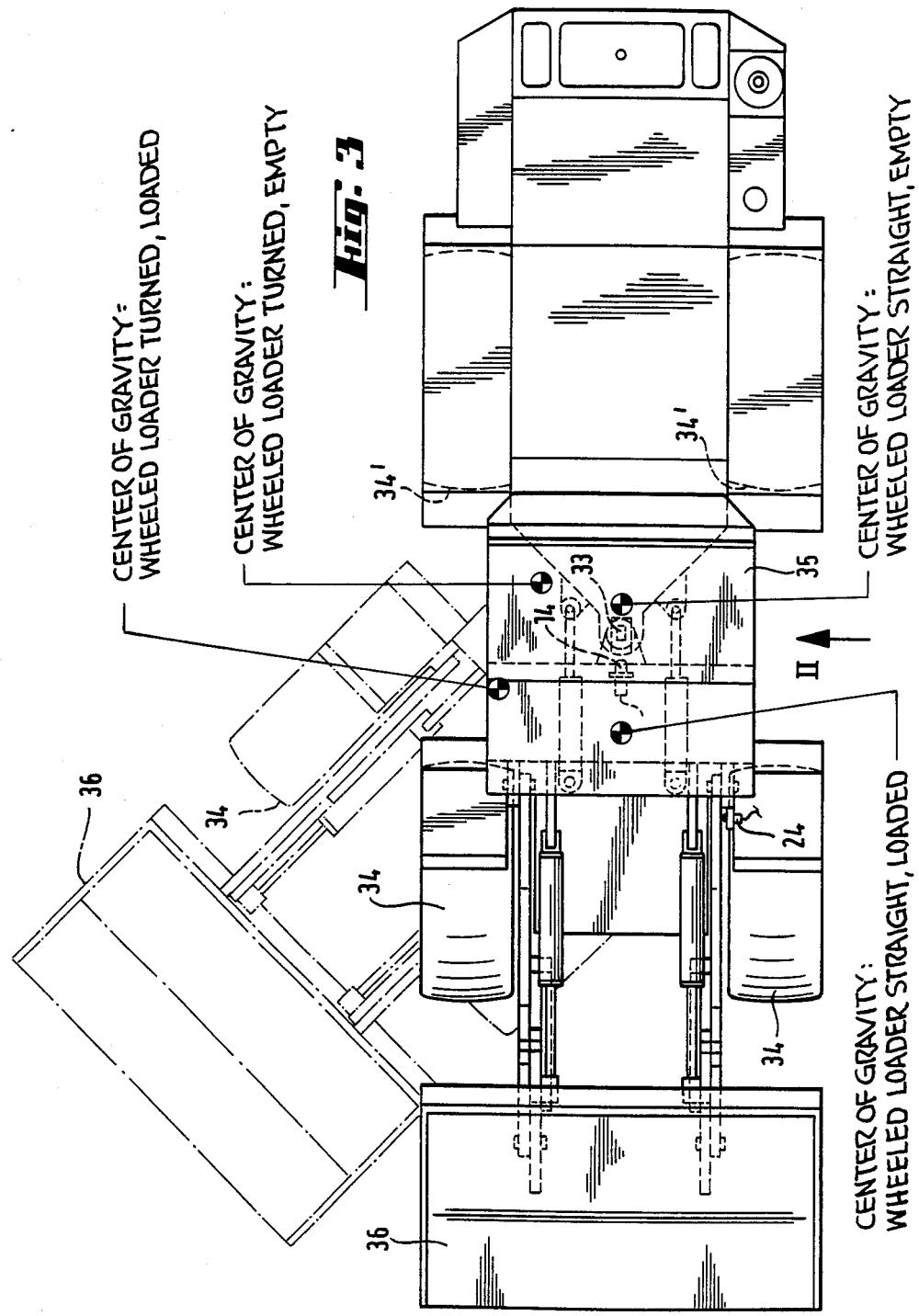

FIGS. 2 and 3 show the various centres of gravity of wheeled loading shovels which result with empty and loaded shovel 36 in the extended or bent position of the vehicle. It is seen from these illustrations what significance the displacement of the centre of gravity has precisely in articulated steering wheeled loading shovels in the various operating states as regards steadiness, stability and road holding of such a vehicle and how important it therefore is to eliminate the difficulties caused thereby.

Figure 4:
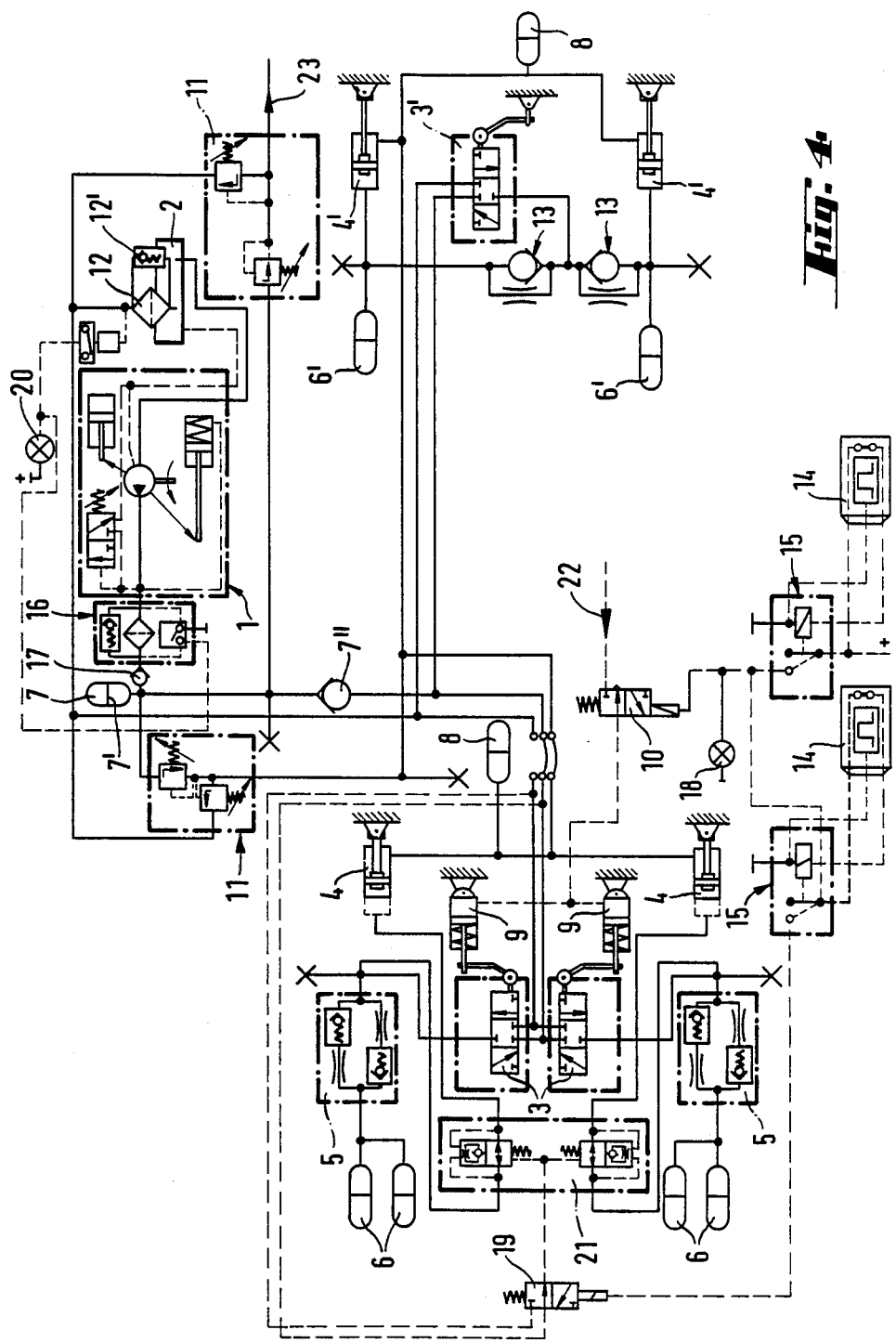
FIG. 4 is an overall circuit diagram of the suspension system of a mechanical shovel.

According to the circuit diagram illustrated schematically in FIG. 4, the hydraulic suspension system is fed by a control pump 1 with zero stroke regulation with oil which is extracted from a hydraulic tank 2 via a return filter 12 with bypass valve 12'. The control pump 1 delivers the hydraulic oil to a central accumulator 7. The latter is constructed as a nitrogen pressure accumulator whose nitrogen filling is separated from the oil chamber by a diaphragm 7'. The fluid coming from the central accumulator 7 is distributed according to the invention via a safety check valve 7" amongst two front level position valves 3 and a rear level position valve 3'. Preferably, level position valves 3, 3' with closed centre are used.

The fluid cylinders 4 and 4' disposed between the axle pivoting levers 38, 41 of the wheel axles 39 and 40, respectively, and the vehicle bodywork, and adapted to be acted on on both sides in accordance with the invention, are normally approximately in their centre position in the suspension position.

The fluid cylinders 4, 4' are provided with end position damping means for damping compression and extension. Via a level position switching valve 10 (pneumatic 3/2 directional magnetic valve) fed by a supply 22 of compressed air and two level position cylinders 9, the suspension according to the invention can be lowered or the fluid cylinders 4, 4' moved according to the invention into the end position damping. In this condition the vehicle bodywork is connected practically or almost rigidly to the respective vehicle wheel axle 39 and 42, respectively, i.e. only a small residual spring travel is present in the damping region of the fluid cylinders 4, 4'. A line 23 leads to the working hydraulics.

When, for example, the vehicle runs over irregularities in the road or ground which are transmitted by the wheels to the axle, the fluid cylinders 4 and 4' and their pistons are displaced out of their centre position. The oil thereby displaced is expelled according to the invention in a damped manner via the constant load damper 5 into the spring accumulator 6, and according to the invention for each front wheel two spring accumulators 6 and for each rear wheel one spring accumulator 6' are provided. The oil flowing into this spring accumulator compresses the nitrogen filling of the accumulator separated from the oil chamber by the diaphragm (corresponding to 7' in the central accumulator 7). In the suspension extension operation the nitrogen presses via the diaphragm the oil through the constant low damper 5 back intp the fluid cylinders 4 and the fluid cylinders, dampened according to the invention by the piston-rod-side oil introduced according to the invention via a pressure-reducing and safety valve 11 move out up to the end position damping. For peak pressure requirements according to the invention a leading accumulator 8 is connected to the piston rod side.

According to the invention the safety valve in the pressure-reducing valve provides security against excessive pressure peaks. At the rear axle the two fluid cylinders 4' are secured with respect to each other according to the invention by throttle check valves 13.

To eliminate as far as possible in certain travelling ranges the difficulties caused in wheeled loading shovels with articulated steering by the displacements of the centre of gravity, according to an essential feature of the invention at least one transverse stabilizing valve 21 is incorporated into the suspension system which communicates in each case with a fluid cylinder 4 and the associated constant load damper 5. This effects that for for example with a differential pressure of about 90 bar (from right to left) in the front fluid cylinders 4, the valve automatically blocks. In this condition the fluid from the highest-loaded fluid cylinder is no longer available for the suspension operation. This results in a substantial improvement and increase in the stabilization of the vehicle.

According to a further essential feature of the invention a limit switch 14 is provided, which on a certain degree of vehicle bend via a relay 15 and a pilot valve 19 emits a signal with the same effect. This limit switch 14 is constructed according to the invention as proximity switch which at a defined bend angle effects a corresponding switching.

In the circuit diagram of FIG. 4 the reference numeral 16 denotes a high-pressure filter behind which a check valve 17 is disposed. In addition, display lamps such as 18 and 20 can be installed at desired positions of the lines.

Figure 5:
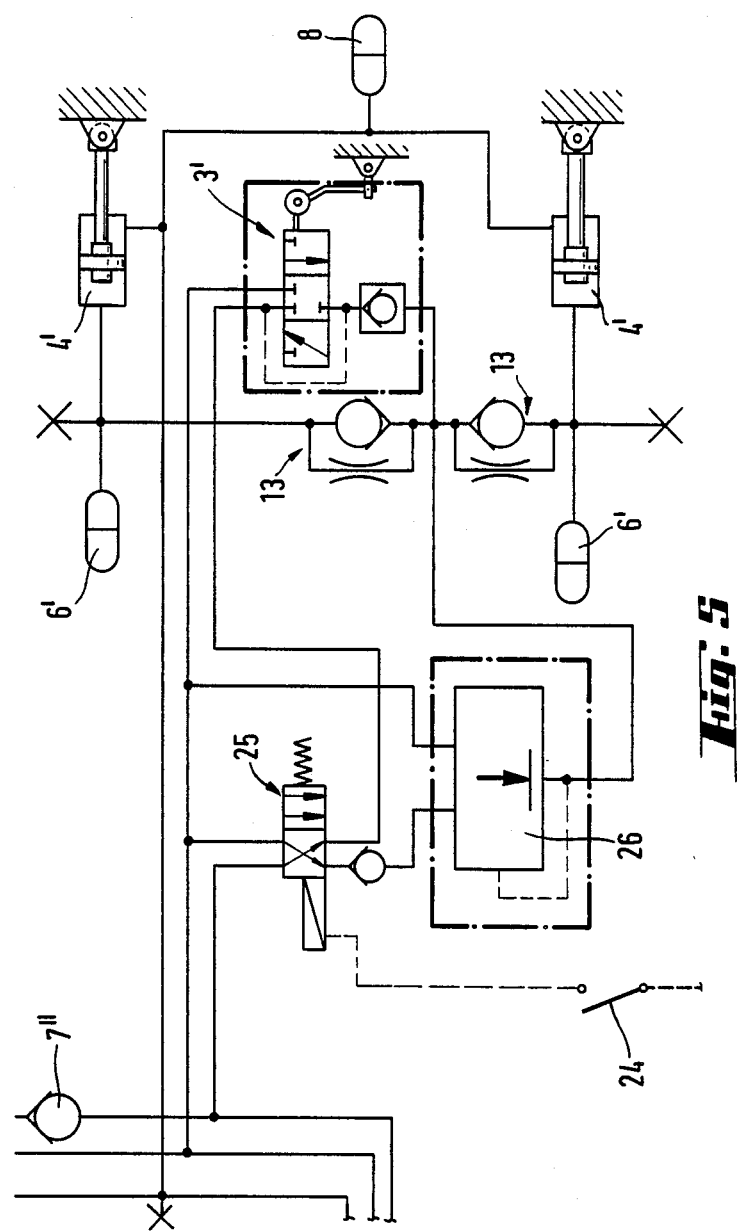
FIG. 5 is a partial circuit diagram of a lift limit switch.

As already stated, a disadvantage in articulated steering vehicles is that on turning in of the vehicle the centre of gravity of the machine moves and the stability of the vehicle is thereby reduced. This disadvantageous condition is aggravated on raising the loading mechanism with useful load. According to a further feature of the invention which is shown diagrammatically in FIG. 5 this difficulty can be overcome by a particular construction of the running gear suspension. For this purpose a limit switch 24 is secured preferably in the vicinity of the lifting arm mounting on the front frame of the mechanical shovel and from a predetermined lifting frame position onwards signals the predetermined height of the shovel 36 to a magnetic valve 25 (e.g. 4/2 directional valve). This magnetic valve 25 controls the fluid via a pressure control valve 26 to the fluid cylinders 4' of the rear axle which is thereby brought with a defined pressure into the position "suspension extension". After this operation an additional supporting is initiated via the rear axle and the vehicle performance also otherwise increased.

The invention is moreover not limited to the example of embodiment described above and illustrated in the drawings but includes all variants within the scope of the essential features of the invention. For example, the invention can be used in a bulldozer or other mobile construction machine analagously to the construction of the mechanical shovel.

We claim:

1. A front-end loader which includes a front carriage and a rear carriage, said front carriage being pivotally connected to said rear carriage so as to be pivotable with respect thereto about a vertical axis, said front carriage including:
   a front frame,
   a front axle,
   a pair of front wheels mounted on said front axle,
   a pair of front suspension systems mounting said front frame about said front axle, each of said front suspension systems including a front pivoting lever, which supports said axle and is pivotally connected at one end thereof to said front frame, and an upwardly extending front hydraulic cylinder, which is pivotally connected at one end to said front pivoting lever and at its other end to said front frame,
   a shovel,
   an articulated arm mechanism connected between said shovel and said front frame for lifting said shovel between a lowermost operating position and an uppermost operating position, and a first limit switch attached to said front frame which is activated when said articulated arm mechanism lifts said shovel to its uppermost operating position, said rear carriage including:
- a rear frame,
- a rear axle,
- a pair of rear wheels mounted on said rear axle,
- a pair of rear suspension system mounting said rear frame above said rear axle, each of said rear suspension systems including a rear pivoting lever, which is pivotally connected at one end to said rear frame, and an upwardly extending rear hydraulic cylinder, which is pivotally connected at one end to said rear pivoting lever and at its other end to said rear frame, and wherein said front-end loader also includes:
- a storage tank for hydraulic fluid, and
- a fluid conduit system for supplying hydraulic fluid from said storage tank to said front and rear hydraulic cylinders, said hydraulic fluid system including a pump; a magnetic directional valve and a pressure control valve for controlling the supply of hydraulic fluid to said rear hydraulic cylinders, said magnetic directional control valve being connected to said first limit switch so as to cause hydraulic fluid to flow to said rear hydraulic cylinders and cause them to expand when said articulated arm is in its uppermost operating position; and at least one transverse stabilizing valve for controlling the flow of hydraulic fluid from said front hydraulic cylinders, thus retarding contraction thereof when subjected to heavy contractive loads.

2. A front-end loader as defined in claim 1, wherein said fluid conduit system includes a constant load damper connected to each of said transverse stabilizing valve.

3. A front-end loader as defined in claim 1, including a transverse stabilizing valve connected to each said front hydraulic cylinder.

4. A front-end loader as defined in claim 1, wherein said front carriage is pivotable with respect to said rear carriage between maximum left and right positions, and wherein said front carriage includes second and third limit switches attached to said front frame which are respectively activated when said front carriage is either in its maximum left or its maximum right positions, and wherein said front carriage includes a pilot valve connected to said at least one transverse stabilizing valve, and first and second pilot switches respectively connected between said second and third limit switches and said pilot valve.

* * * * *